May 17, 1955
D. PUZEY
2,708,504
AUTOMATIC POWER CORN RAKE DEVICE
Filed July 17, 1952
4 Sheets-Sheet 1
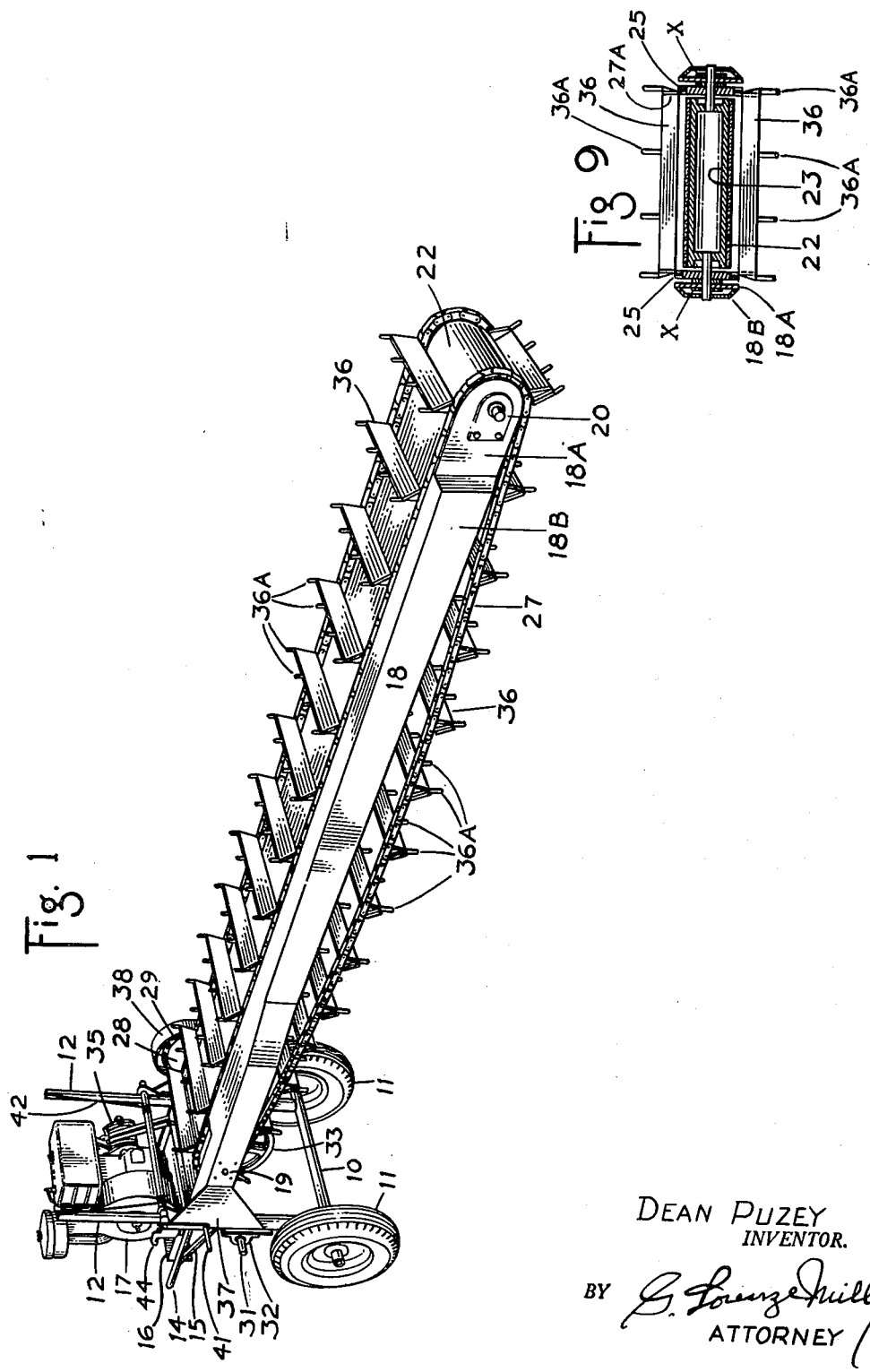
DEAN PUZEY
INVENTOR.
BY
ATTORNEY May 17, 1955

D. PUZEY 2,708,504

AUTOMATIC POWER CORN RAKE DEVICE

Filed July 17, 1952

DEAN PUZEY
INVENTOR.

BY *G. Lorenz Miller*

ATTORNEY

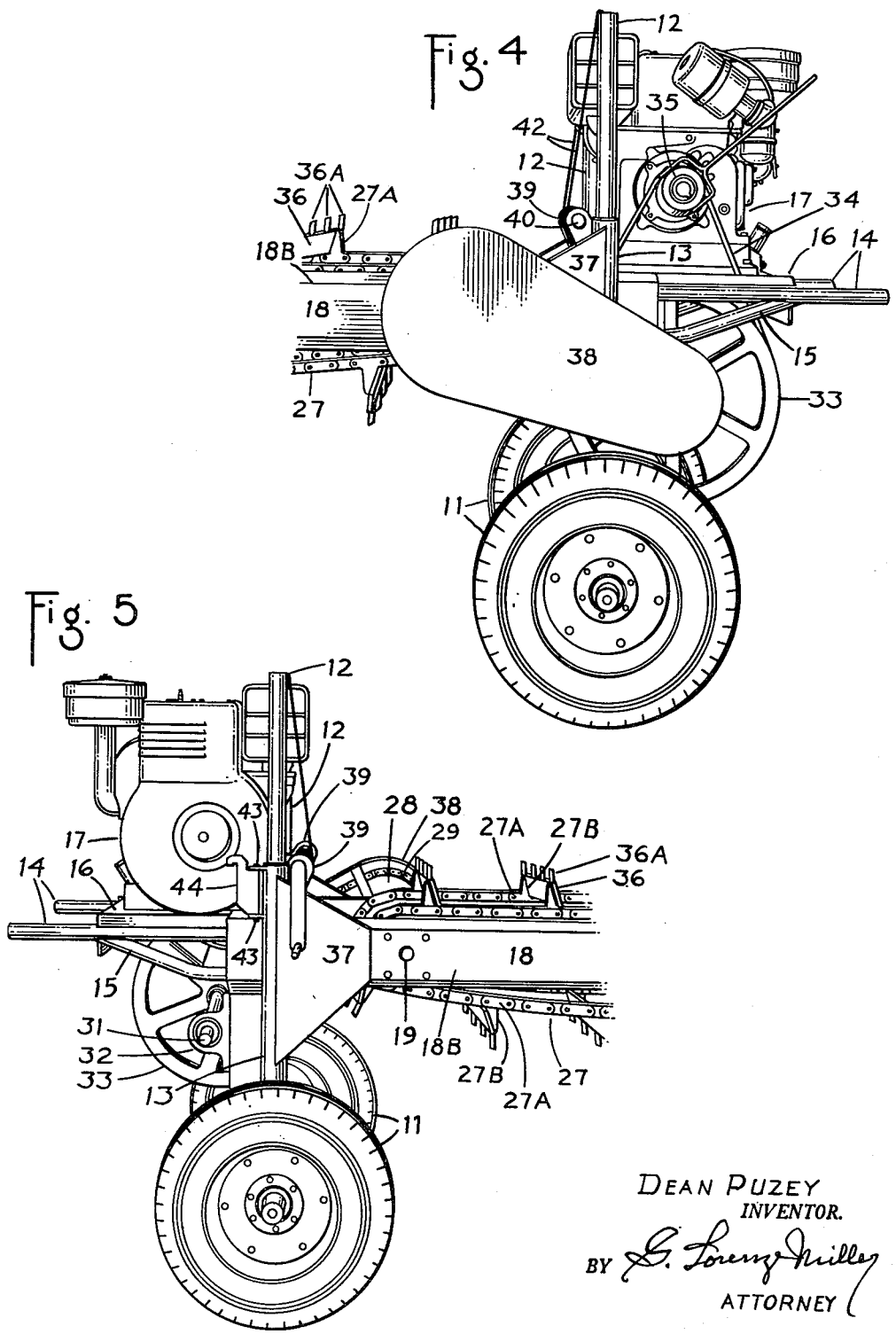

May 17, 1955
D. PUZEY
2,708,504
AUTOMATIC POWER CORN RAKE DEVICE
Filed July 17, 1952
4 Sheets-Sheet 4
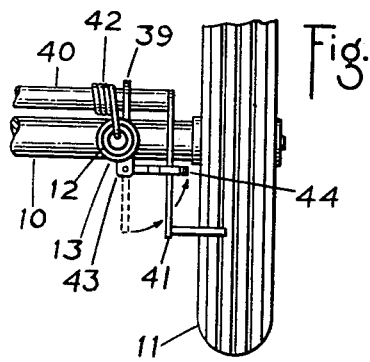
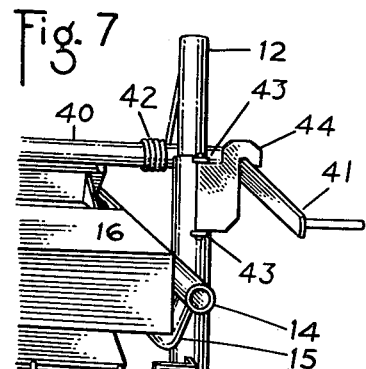
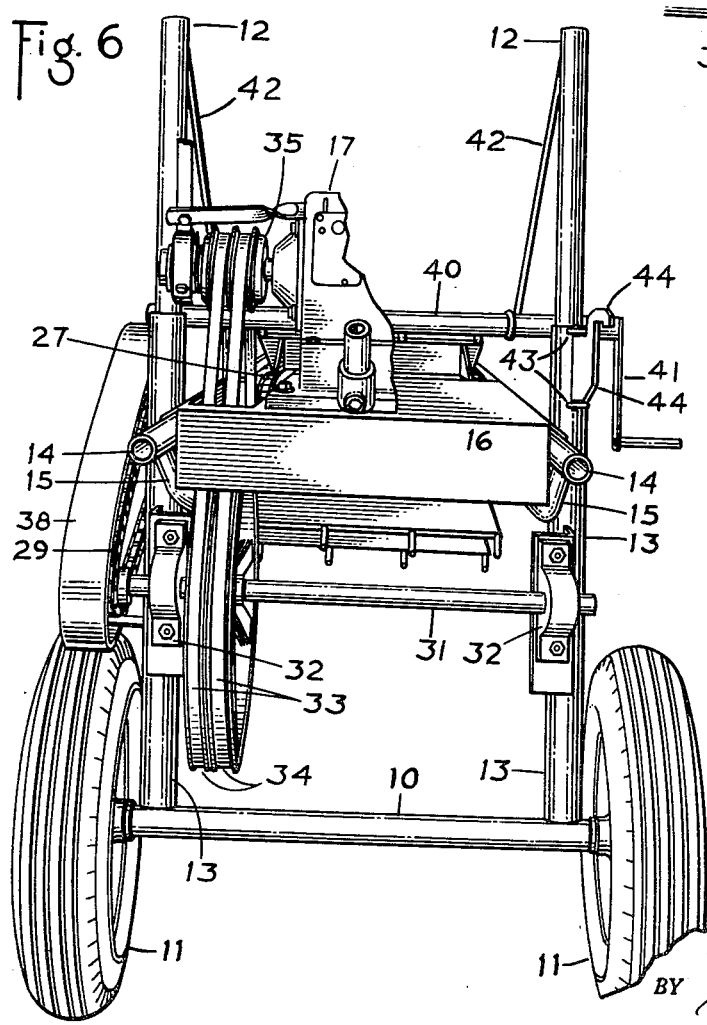
DEAN PUZEY
INVENTOR.
BY *G. Lorenz Reilly*
ATTORNEY

United States Patent Office 2,708,504
Patented May 17, 1955

2,708,504

AUTOMATIC POWER CORN RAKE DEVICE

Dean Puzey, Fairmount, Ill., assignor to Puzey Bros., Inc., Fairmount, Ill.

Application July 17, 1952, Serial No. 299,397

2 Claims. (Cl. 198—126)

The present invention relates to a machine for raking eared corn, and has more particularly to do with a machine of this type for raking eared corn from storage cribs and the like for shelling or transportation.

Heretofore the removal of eared corn from storage required considerable hand labor by at least two or three men handling shovels, forks and hand rakes, obviously involving a great deal of hard manual labor and much time, inasmuch as the corn had to be first moved from within the crib toward the door or other crib opening, and then shoveled either from the crib or the ground into suitable conveyances. By such procedure it is readily apparent that inconvenience and undue expense add considerably to the farmer's production cost in any case, but especially where eared corn is being removed from storage to the usual corn shelling machinery.

To facilitate economical and convenient handling of eared corn the invention contrives, for example, to enable the corn to be raked to the door of the crib and raked therefrom onto a drag or conveyor mechanism for delivery in turn to the usual shelling means.

An important object of the invention, therefore, is to provide a machine of this type which carries suitable means for providing its own power and which requires but one man to operate it, thereby eliminating the expenditure entailed in the employment of excess labor.

Another object is to provide a machine of continuously automatic operation, and so constructed and arranged that it may be easily manipulated by one man, its motor element being so mounted as to effectively counterbalance the machine, thus facilitating its ready and convenient handling in use.

A further object is to provide an efficient and practical machine of this type, simple and sturdy in construction and arrangement of parts, of unitary and self-complete assembly, enabling its easy and quick movement from one location to another with or without shutting off the power.

With the above and other objects in view which will be more readily evident as the character of the invention is better understood, the same consists in the novel construction, combination and arrangement of parts hereinafter more fully described, illustrated and claimed.

One practical but non-limiting embodiment of the invention is shown in the accompanying drawings, in which:

Figure 1 is a general perspective view of the invention as seen, for example, from within a corn crib, and showing the motor as mounted on the left-hand end in the view.

Figure 4 is an elevational view of the motor end of the invention, the rake portion cut off to conserve space.

Figure 5 is a view similar to Fig. 4, but taken from the opposite side.

Figure 6 is a rear elevational view, part of the motor removed to facilitate the clear showing of the elevator means of the device.

Figure 7 is a fragmentary elevational view of the right-hand side of Fig. 6, showing the elevating mechanism and one elevated position of the motor end of the improved corn rake.

Figure 8 is a fragmentary top plan view of the elevating structure in Fig. 7, showing in particular the locking element engaging the elevator handle as when the motor end is elevated as illustrated in Fig. 7, and, Figure 9 is a view partly in section and partly in elevation, including the area indicated by the lines A—A in Fig. 3, looking in the direction of the arrows.

Figure 3:
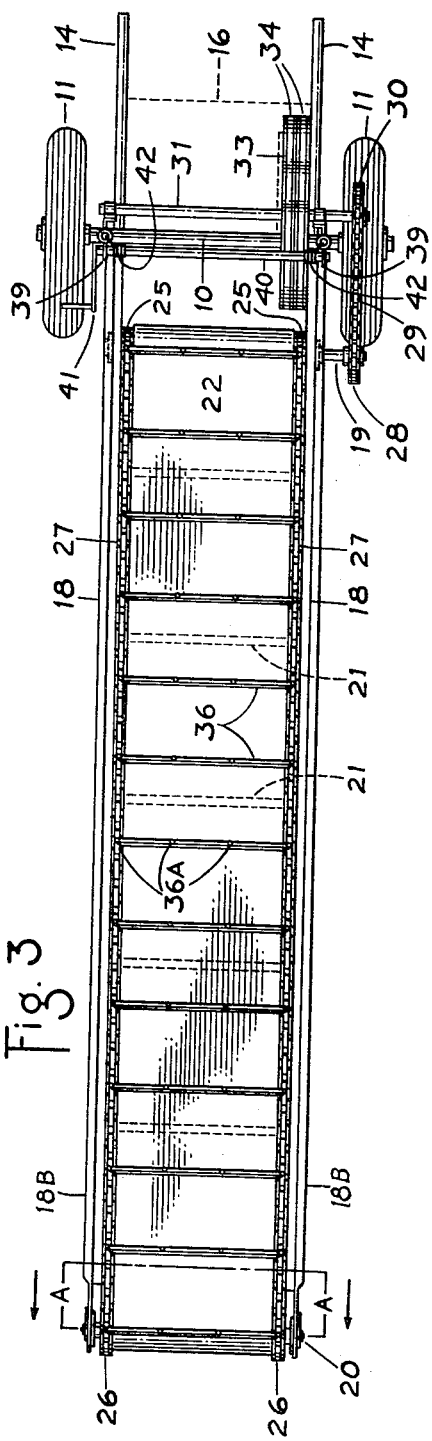
Figure 3 is a top plan view of Fig. 2, but the motor removed to disclose clearly the chain driven means and the frame portion of the device.
Figure 2:
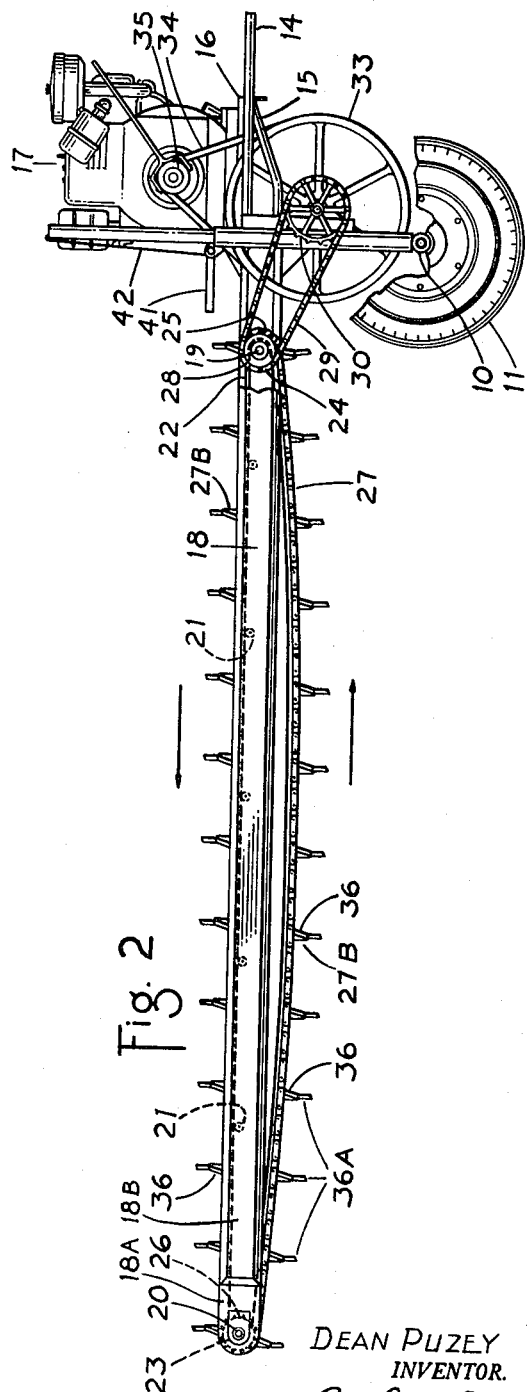
Figure 2 is a side elevational view, parts of the right-hand end being removed to enable the showing of the belt drive means from the motor, and the chain driven means related to and engaged therewith.

Referring now to the drawings in detail and in particular the structure, arrangement of parts, and related operation of the various improved features embodied in the present invention, having reference first to Figs. 1, 2 and 3, there is illustrated the preferred but non-limiting form of apparatus for practicing the invention comprising the wheel-mounted supporting axle 10, the wheels 11 enabling the machine to be moved into suitable position for operation as well as facilitating the desired balance of the machine, as it may in use, be tilted up or down from, or to a horizontally or inclined plane, depending on the height of the corn crib outlet door from the ground and also the level of the corn being raked, especially when the corn in the crib is at the low level as when the crib is nearly emptied.

Integrally mounted on the axle 10—see Figs. 6, 7 and 8—are the vertically extending supporting shafts 12 serving to support the device generally and to slidably engage the elevator sleeves 13 which carry one end of the general frame, the motor and the power transmission mechanism of the invention.

Fixed to the elevator sleeves 13 are the horizontally and oppositely disposed bar members 14 and their braces 15, and fixedly mounted between the bar members 14 is the motor platform 16 on which the motor 17 is suitably mounted. The invention being complete and self-contained, a conventional type of gasoline motor is used, the same being also adapted to provide the necessary weight to counterbalance the device, the motor being so placed on the platform 16 as to be the weight equivalent of the rake portion, thus facilitating ready and easy maneuverability of the machine.

Suitably fixed to and in prolongation of the bar members 14 are the hollow frame members 18 having the flat inner face portion 18A and the substantially channel shaped outer face portion 18B (see Fig. 9).

The inner face portion 18A of the frame members 18, being oppositely disposed, serve as mounting means for the driven axles 19 and 20 and also for a series of spaced apart idler rollers 21. The idler rollers 21 engage the under face of the upper course of the shield belt 22 to maintain the same in a substantially parallel position with respect to the frame members 18. The shield belt 22 is adapted to shield the gear and chain elements of the device from eared corn or kernels therefrom which would otherwise tend to become entangled with and interfere with the general rake mechanism.

Referring to Fig. 9 it will be noted that a hollow roller element 23 is mounted on the axle 20 which in turn is suitably rotatably engaged in conventional bearing elements as at X. Said roller element 23 engages the shield belt 22 at the forward end of the machine in operation, and a like roller element 24 similarly engages the shield belt 22 at the motor end of the machine. Conventional sprocket gears 25 and 26 are provided on the axles 19 and 20 respectively.

Spanning the sprocket gears 25 and 26 and paralleling both edges of the shield belt 22 are the drive chains 27. It is evident therefore that the shield belt 22 is carried by the roller elements 23 and the shield belt is independent and not connected to the drive chains 27. The axle 19 as shown in Fig. 3 projects a relatively short distance from one side of the device and has fixedly mounted on its outer end the sprocket gear 28 which is driven by the chain 29 from the sprocket gear 30 fixedly mounted on the projecting end of the drive shaft 31 journaled in the bearing elements 32 suitably mounted on the elevator sleeves 13.

Integrally mounted on the drive shaft 31 are the twin drive wheels 33 adapted for engagement with suitable drive belts 34 which in turn engage and are driven by the pulley element 35 of the motor 17, which, in the present invention is a 4-H. P. gasoline type, of conventional design, although the motor is non-limiting, as other suitable types of motors may be used. And, in view of the non-limiting character of said motor, as aforesaid, the controls for the motor, such as the starting lever, the throttle, etc., are not described nor numbered, as the same would not have any particular bearing on the invention as such.

At spaced intervals on the drive chain 27 are link members 27A having integral outwardly projecting lug members 27B, the front face of which inclines rearwardly approximately 20°, being adapted for suitable integral engagement with the cross-bar 36, and these cross bars 36 are provided with a plurality of spaced apart smooth teeth 36A preferably welded in position along the outer edge of said cross-bars.

These teeth are beveled approximately 45° at their ends, the bevel inclining rearwardly, that is, oppositely from the direction travel of the chains 27, such bevel providing against abrasion of the corn crib floor and undue damage to the eared corn being raked.

It will be apparent from reference to Fig. 9 that the opposite ends of the cross-bars 36 are shaped to incline outwardly and upwardly and this shape enables the two oppositely positioned teeth 36A to accomplish a broader sweep in the raking action.

It is here pointed out that the peculiar form of the hollow frame members 18 serves as a guide means as well as a protective element when the machine is in use, as said frame members provide smooth uninterrupted side edges longitudinally on the machine, thus facilitating the easy manipulation of its rake portion through the corn crib door while at the same time protecting the sides of the door opening from damage or undue wear.

It is obvious that the drive chains 27 are so arranged on the machine as to position the link members 27A exactly opposite each other with respect to the oppositely positioned chains 27, to effect the true lateral arrangement of the cross-bars 36 on the machine, as shown especially in Fig. 3. It is obvious too, that the plate members 37 integrally secured preferably by welding on the machine are provided for the purpose of bracing and rigidity, and that the chain guard element 38 is provided as a safety measure.

Integrally mounted on the front face of the elevator sleeves 13 are the alignedly positioned bearing members 39 adapted to rotatably engage the elevator windlass shaft 40 having mounted on one end the handle 41. The cables 42 are suitably secured at their lower ends to said windlass shaft 40, and at their upper ends to the upper ends of the supporting shafts 12. Adjacent the upper end of one of the elevator shafts 13 are two integrally mounted lug members 43 suitably adapted for swingably engaging the stop member 44 in its arcuate movement—as indicated by the directional arrows in Fig. 8—from its idle position—indicated by the dotted lines therein—to the stopping engagement with the handle 41, as when the machine in general is elevated to the desired plane, depending upon the location of the corn crib door. It is obvious that the entire general structure of the machine, except the axle 10 and wheels 11, may, by turning the handle 41 clockwise, be raised, or, by turning the handle 41 counter-clockwise, be lowered, as occasion may demand.

From the foregoing description, the operation of the present invention is believed to be clear, but to give further understanding thereof it is briefly summarized as follows:

In the practical application of the invention in its intended use, the operator grasps the bar members 14 and wheels the machine into position suitable to rake the eared corn from the crib door and starts the motor. The power then transmitted from the pulley 35 of the motor 11 by means of the twin drive belts 34 to the twin drive wheels 33, and thence through the sprocket gear 30, chain 29 and sprocket gear 28 to the sprocket gears 25, actuates the drive chains 27 in the direction indicated by the arrows in Fig. 2, which action, of course, propels the entire raking mechanism in the same direction, so that the upper and forwardly moving portion of the raking element of the device rolls over the forward end thereof and so becomes the lower and rearwardly moving part of said raking element, and thus the teeth 36A rake the eared corn out of the crib and into such receptacle or conveyor as may be provided.

It is pointed out that the inclined angle at which the cross-bars 36 are set, while tending to induce the eared corn away from the lower face of the raking element, thereby substantially decreasing pressure of the corn ears against the shield belt 22, yet the teeth 36A effectively rake the corn ears toward and out of the crib door with a minimum of wear on the machine and little or no damage to the corn.

Without further description, the novel features and advantages of the invention are believed to be fully apparent, and while the present structure and arrangement of parts is of the preferred type, it is to be understood that changes in the form, proportion and construction details may be made without deviating from the spirit and scope of the invention.

What is claimed is:

1. In a machine of the type herein described comprising a wheel mounted axle having fixedly mounted thereon a pair of vertically and parallelly extending shaft members, a general frame portion fixedly mounted between the shaft members and extending a substantial length substantially horizontally from the shaft members, a pair of vertically and parallelly arranged sleeve members fixedly mounted on one end of the general frame portion and slidably engaging said shaft members for the purpose of enabling the elevation of said frame portion to various heights on the shaft members for use, windlass shaft means spanning and suitably journalled on the upper end of said sleeve members, cable means secured to and extending upwardly from the windlass shaft means and suitably secured to the upper end of said shaft members, a handle fixed on one end of the windlass shaft means and adapted for winding the cable means on the windlass shaft for the purpose of elevating and lowering the general frame portion to desired heights for use, parallelly arranged handle members extending from and in prolongation of said frame portion, a platform mounted on said handle members, a suitable motor suitably mounted on the platform and adapted to counterbalance the general frame portion, sprocket and chain means engaging suitable bearing means and roller means carried by the general frame portion, said chain means carrying at spaced intervals along the length thereof a plurality of bar members arranged laterally of the machine, said bar members arranged at an angle of approximately 20° inclining rearwardly of the machine, the bar members having integrally mounted thereon a plurality of spaced apart teeth members protruding outwardly from and transversely of the bar members, sprocket and chain means between said motor and said roller and chain means carried by the general frame portion for effecting the continuous movement of said bar members along the upper course of the frame portion toward and over its front end and return in endless succession for the purpose of raking eared corn from a crib, means on the general frame portion for protecting the sides thereof from damage and undue wear in use, and means carried by said frame portion for shielding the general raking mechanism from interrupted operation and damage due to contact of the eared corn with said general raking mechanism.

2. In a machine of the type herein described comprising in combination a wheel mounted axle having fixed thereon vertically extending shaft means for supportedly and slidably engaging a general frame portion, means on the general frame portion for slidably engaging said shaft means for the purpose of elevating the general frame portion to various heights for use, motive power means suitably mounted on one end of said general frame portion to counterbalance the frame portion, one end of said frame portion extending a substantial length and right-angularly from said vertically extending shaft means, means mounted on the general frame portion for carrying a series of spaced apart corn raking elements, said corn raking elements comprising a pair of parallelly arranged endless chain elements having at spaced intervals thereon projecting lug members, the lug members having an inclining face adapted to fixedly engage a crossbar member, a crossbar member spanning said chain elements at the location of and fixed to the lug members, the crossbar members having their opposite ends tapered outwardly and upwardly, a plurality of smooth round teeth fixedly mounted on and extending at spaced intervals from the outer edge of the crossbar members, the outer end of said teeth beveled at approximately 30°, means on the general frame portion for effecting the continuous movement of said corn raking elements into and out of a corn crib door in practice of the invention, means carried by the frame portion and associated with said raking elements for excluding the corn falling from the raking mechanism, means on said general frame portion for maneuvering the machine in use, and means on the frame portion for easily guiding said raking mechanism through the door of a corn crib and for preventing damage thereto.

UNITED STATES PATENTS
References Cited in the file of this patent

| | | |
|---|---|---|
| 611,167 | Bodley | Sept. 20, 1898 |
| 876,640 | Hassel | Jan. 14, 1908 |
| 1,659,973 | Goodner | Feb. 21, 1928 |
| 2,427,114 | Arnett | Sept. 9, 1947 |